E. C. MOORE.
APPARATUS FOR CONTROLLING THE ADMISSION AND RELIEF OF PRESSURE TO TANKS
AND OTHER APPLIANCES.
APPLICATION FILED APR. 16, 1907.
914,497.
Patented Mar. 9, 1909.
2 SHEETS—SHEET 1.
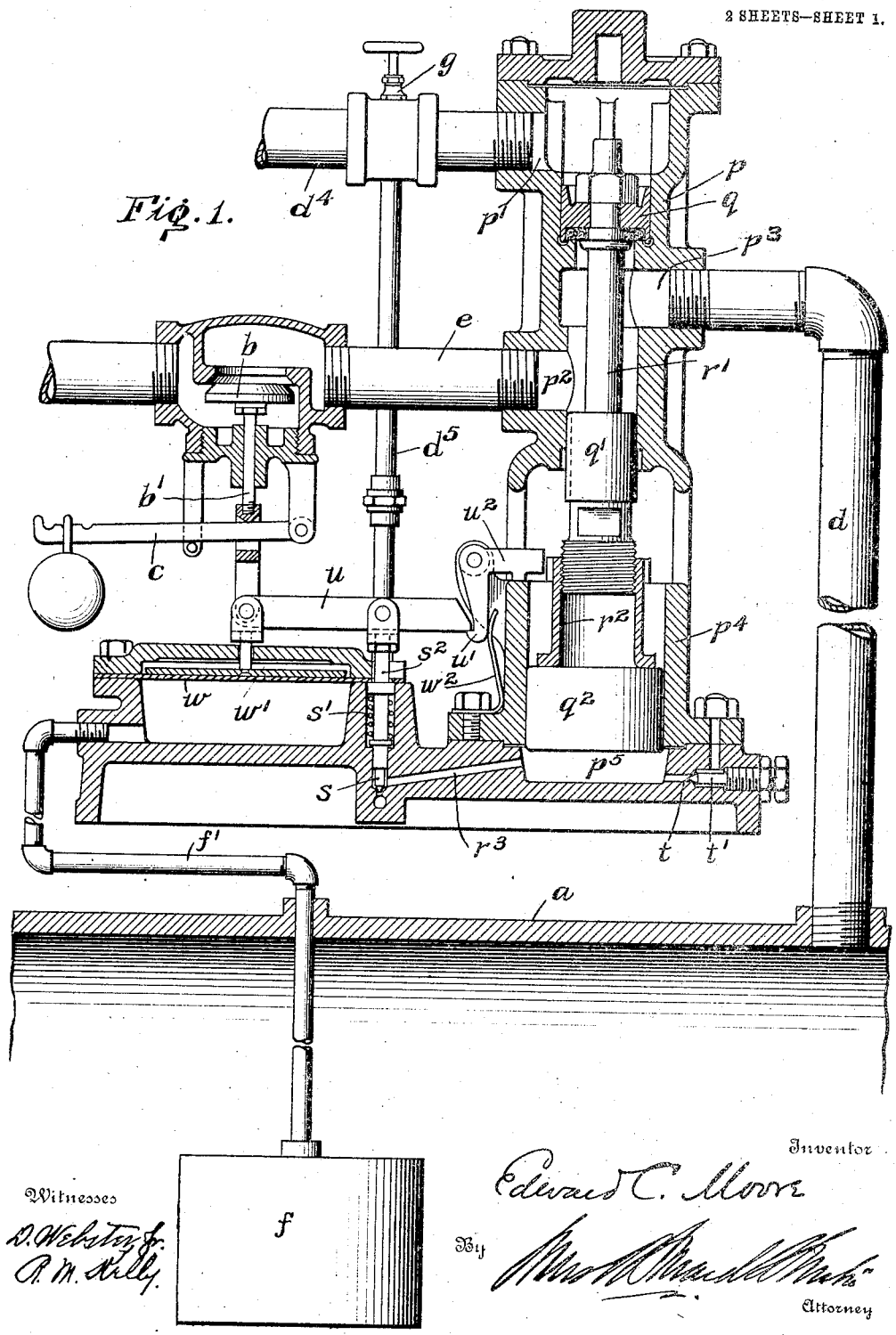
Fig. 1.
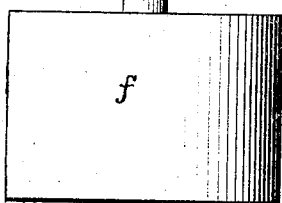

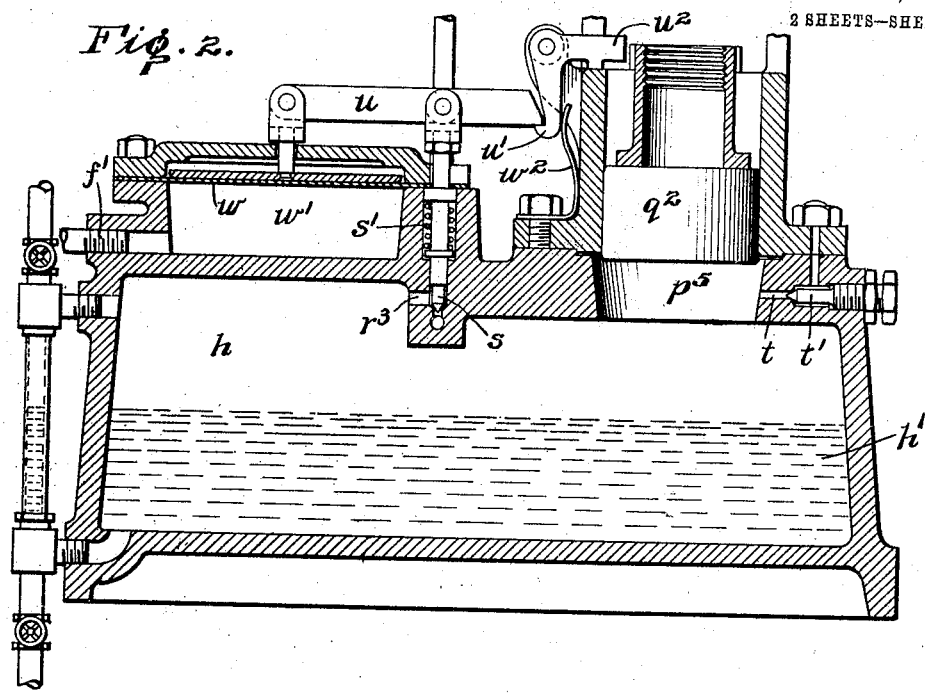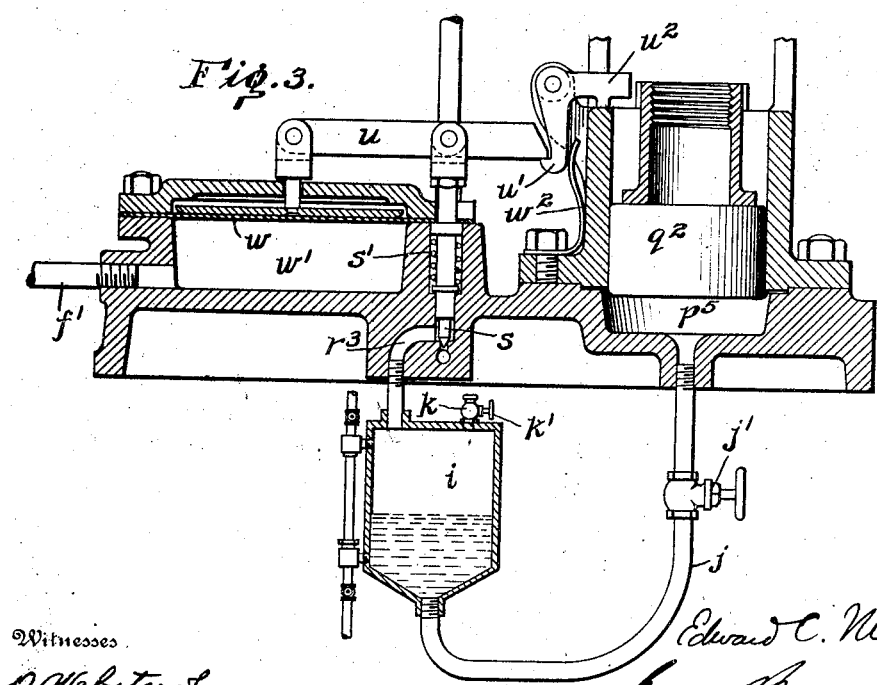

UNITED STATES PATENT OFFICE.

EDWARD C. MOORE, OF PHILADELPHIA, PENNSYLVANIA, ASSIGNOR TO MERRITT & COMPANY, A CORPORATION OF PENNSYLVANIA.

APPARATUS FOR CONTROLLING THE ADMISSION AND RELIEF OF PRESSURE TO TANKS AND OTHER APPLIANCES.

No. 914,497.

Specification of Letters Patent.

Patented March 9, 1909.

Application filed April 16, 1907. Serial No. 368,560.

*To all whom it may concern:*

Be it known that I, EDWARD C. MOORE, of the city and county of Philadelphia and State of Pennsylvania, have invented an Improvement in Apparatus for Controlling the Admission and Relief of Pressure to Tanks and other Appliances, of which the following is a specification.

In many cases where fluid pressure is applied to a tank or other appliance for the purpose of forcing material or producing other results, it is necessary or desirable that such pressure should be applied and relieved at intervals, and that the moment of relief should be timed, and controlled independently of the means which control the admission of the pressure. This is particularly the case in sewage forcing apparatus, in which sewage is forced from a tank or receptacle by air pressure admitted to the tank through a force pipe. The admission of the pressure is usually controlled automatically by the level of the contents of the tank, but it is necessary that the relief of the pressure should be controlled by means independent of the level of the contents, so that the pressure may be maintained to fully discharge the contents after the level has fallen to such an extent as would relieve the pressure, if it was not otherwise controlled. It is also desirable in many cases that the operation of the pressure relieving devices should be timed so that the relief may take place at a fixed interval after the pressure is applied, and that the interval may be varied and regulated to suit the requirements of the particular case.

I do not mean to limit my invention in its application to any particular use, but for purposes of explanation I have shown it applied to a sewage tank or receptacle for the purpose of discharging the sewage from the tank to a higher level; and in this case the admission of the pressure to the tank is controlled by pneumatic devices controlled by the level of the contents of the tank. The invention may be applied for example to the admission of air blasts at intervals to a fog-horn, or to any case where the pressure is to be applied and relieved at intervals and the relief is controlled by means independent of those which control the admission.

My improvements relate particularly to the means for automatically controlling the admission of the pressure to the tank or other appliance and its relief at the proper time.

A part of my improvements relates to the valve devices for controlling the admission of the pressure to the force-pipe and for venting the same and to the means for controlling said valve devices. For this purpose I employ means actuated by fluid pressure to operate the valve-devices which control the force-pipe and control the operation of said means preferably by a fluid pressure motor which may be controlled by the conditions in the tank or appliance to which the pressure is admitted.

As it is the level of the sewage in the tank which is the condition usually relied upon to control the admission of pressure to the tank, it is desirable when the invention is applied to the raising of sewage that the relief of that pressure should be controlled independently of said condition, so that pressure may be maintained to expel the contents after the level has fallen to such an extent as would relieve the devices which the level controls; and a part of my improvements relates to the means for enabling the relief of the pressure in the tank to be controlled and timed independently of the devices controlled by the conditions in the tank for controlling the admission of the pressure. As it is desirable, however, that in no case should the pressure be relieved until the level of the contents of the tank has fallen to such an extent as to relieve the devices which the contents control, I employ additional means controlled by said devices to prevent the venting of the force-pipe until such devices are relieved.

In the drawings: Figure 1 is a vertical sectional view of my pneumatically controlled valve devices for controlling the pressure pipe, showing the same connected with a sewage receptacle and with pneumatic controlling devices which are controlled by the sewage; and Figs. 2 and 3 are similar views of part of the same on a reduced scale illustrating modifications.

*a* is any appliance to which the pressure is applied at intervals; as shown it is a forcing tank or receptacle which receives sewage and from which the sewage is forced through a suitable discharge pipe (not shown).

$d$ is a fluid pressure pipe which leads to the upper part of the receptacle $a$.

$p$ is a valve cylinder having an inlet port $p'$ from the pressure main $d^4$, and an outlet port $p^2$ to the vent pipe $e$, and a port $p^3$ to the pressure pipe $d$. In the upper part of the cylinder $p$ is a piston valve $q$ which controls communication between the ports $p'$ and $p^3$, and below this, carried by the piston rod or stem $r'$, is a valve $q'$, which controls the communication between the ports $p^2$ and $p^3$. The valves $q$ and $q'$ constitute the valve devices which control the pressure pipe $d$ to admit pressure to the tank $a$ and to relieve the same. As shown, the means for operating the valves $q$ and $q'$ consist of a piston or pressure motor.

$p^4$ is a cylinder below the cylinder $p$, in which is a motor or piston $q^2$ connected by a suitable coupling $r^2$ with the rod $r'$. The piston $q^2$ is of larger diameter than the piston valve $q$.

$d^5$ is a branch pipe from the pressure main $d^4$ which communicates with the cylinder $p^4$ below the piston $q^2$ by a suitable port or passageway $r^3$. This port or passageway is controlled by a valve $s$, normally closed by a spring $s'$. When the valve $s$ is opened air pressure from the branch $d^5$ will extend into the cylinder $p^4$. The same pressure per square inch will then be acting oppositely on the pistons $q\ q^2$, and by reason of the greater area of the latter the pistons will move forward and the vent port $p^2$ will be closed by the valve $q'$, while the valve $q$ will open communication between the ports $p'$ and $p^3$ and the air pressure will be admitted to the pipe $d$ and thence to the receptacle $a$ to discharge its contents.

$t$ is a vent from the piston chamber $p^5$ or cylinder $p^4$ below the piston $q^2$, through which the compressed air may escape, when the valve $s$ is again closed. The high pressure from the port $p'$ is then acting on the piston $q'$ and when the pressure below the piston $q^2$ is reduced sufficiently, the higher pressure on the smaller piston $q'$ will force the pistons back, closing communication between the ports $p'$ and $p^3$ and restoring communication between the ports $p^3$ and $p^2$ and vent pipe $e$ to relieve the pressure in the pipe $d$ and tank $a$. The vent $t$ may be regulated by a valve $t'$ to control the escape from below the piston $q^2$ and the time at which the valves $q$ and $q'$ will be operated. The operation of the valves $q\ q'$ is thus controlled by the valve $s$ and that valve may be controlled in any suitable manner. As shown it is controlled by the conditions, i. e. the accumulations of sewage, in the tank $a$.

As shown the stem $s^2$ of the valve $s$ is pivoted to a lever $u$, one end of which has its fulcrum at $u'$ and the other end of which is connected with a pressure motor $w$. The motor chamber $w'$ is connected by the air pipe $f'$ with the bell $f$ in the tank or receptacle $a$, or in a chamber communicating therewith. When the sewage accumulates in the tank $a$ and forces air through the bell $f$ and pipe $f'$ into the motor chamber $w'$, the motor $w$ will be lifted and this will rock the lever $u$ on its fulcrum $u'$ and open the valve $s$. Pressure from the pipe $d^5$ will be admitted to the chamber $p^5$ and the piston $q^2$ and valves $q$ and $q'$ will be operated in the manner described.

It is desirable that the closing of the valve $s$ should be independent of the action of the pressure motor $w$, so that it may close again immediately after the piston $q^2$ has been operated, and for this purpose, I employ the movable fulcrum $u'$. As shown this is a bell crank, of which one arm acts as the fulcrum $u'$ and the other arm $u^2$ projects in the path of the piston $q^2$, or of some part moving with it, so that when the piston is moved to operate the valves it will strike the arm $u^2$ and rock the bell crank so as to remove the fulcrum $u'$ from under the end of the lever $u$. As the lever is then unsupported at its outer end, the spring $s'$ will pull it down and close the valve $s$. A spring $w^2$ acting on the bell crank $u'\ u^2$ maintains it in normal position and causes the fulcrum $u'$ to reëngage the lever $u$ after pressure is relieved in the motor chamber $w'$. The closing of the valve $s$ is thus independent of the operation of the motor $w$ and of the conditions in the tank $a$. While the valve $s$ remains open, the pressure in the chamber $p^5$ prevents the return of the piston $q^4$ and the operation of the valves $q\ q'$, and as it is desirable that the operation should be independent of the conditions in the tank, it is desirable that the closing of the valve $s$ should also be independent of those conditions. While it is desirable that this operation of the valves $q\ q'$ should be independent of the conditions in the tank $a$, it is not always desirable that the venting of the pipe $d$ should be independent of those conditions. After pressure has been admitted to the tank $a$ the port $p'$ may be closed and the compressed air may be used expansively to force out the contents of the tank, but to accomplish this the vent must be closed. For this purpose I employ a valve $b$ in the vent pipe $e$ having its stem $b'$ connected with the motor $w$ or with the lever $u$. The operation of the valve $b$ may be regulated by the usual weighted lever $c$ acting to open the valve. The valve $b$ is thus controlled by the motor, and so long as there is sufficient pressure in the motor chamber $w'$, the valve $b$ will keep the vent closed. The vent pipe $e$ will remain closed until the pressure in the tank $a$ acting through the bell $f$ and pipe $f'$ has relieved the pressure in the chamber $w'$ to a sufficient extent to permit the weight $c$ to open the valve $b$. This use of the air or fluid expansively is very desirable as it enables a measured charge of compressed air or fluid to be used at each operation, and to obtain the full advantages of such a system the measured charge should be just sufficient to do its work and the pressure should not be relieved until the charge has accomplished that work by an expansion continued to the intended extent. This result is accomplished by admitting a charge of compressed air only sufficient, when used expansively, to give a resulting pressure, when the liquid has been forced from the tank, equal to the pressure due to the head against which the liquid has been lifted. It will be noted that the charge of compressed air is admitted when the rising fluid has filled the receiver to an extent sufficient to act on the motor $w$ through the bell $f$, but the exhaust valve $b$ opens regardless of the falling level of the liquid and only when the pressure in the tank is reduced to such an extent by the expansion of the air that the weight of the valve $b$ and its connections plus the downward pressure on the valve exerted from the tank through the pipes $d$ and $b$ is sufficient to overcome the upward pressure on the motor exerted from the tank through the bell $f$ and pipe $f'$.

In the particular form of the apparatus shown in Fig. 1, the timing of the operation of the piston $q^2$ and the valves $q\ q'$ is governed wholly by the relief valve $t'$, i. e. by the accumulation of pressure in a space of fixed cubical capacity. In some cases, however, it is desirable that the operation should be controlled by varying the cubical capacity of the space. Such an arrangement is shown in Fig. 2. The passage $r^3$, instead of leading directly into the chamber $p^5$ below the piston $q^2$, leads into a chamber $h$ which opens into the chamber $p^5$. It is obvious that the interval of time before the piston $q^2$ is operated after the valve $s$ is opened will depend upon the cubical capacity of the chamber $h$, and this cubical capacity may be varied, and consequently the time of operation of the piston $q^2$, by the introduction of liquid $h'$ in the chamber $h$.

In the forms shown in Figs. 1 and 2, the piston $q^2$ is operated by the direct pressure upon it of the air or gas admitted by the valve $s$. In some cases, however, it is desirable to operate the piston $q^2$ by a liquid, such as oil, and for this purpose the modification shown in Fig. 3 may be used. $i$ is a vessel containing the oil or piston actuating fluid and communicating through a pipe or conduit $j$ with the piston chamber $p^5$. The passage $r^3$ leads to the vessel $i$. When the valve $s$ is opened, the pressure on the surface of the liquid in the vessel $i$ forces the liquid through the conduit $j$ into the chamber $p^5$ and actuates the piston $q^2$. The speed of the piston $q^2$ and valves $q\ q'$ may thus be regulated with great nicety. $k$ is a vent from the vessel $i$ which may be controlled by a suitable valve $k'$. $j'$ is a valve in the liquid pipe or conduit $j$. The return of the liquid through the conduit $j$, and consequently the time of the return of the piston $q^2$ and the operation of the valves $q\ q'$ may be controlled by this valve $j'$. By closing this valve $j'$ after the piston $q^2$ has been operated the liquid may be confined in the chamber $p^5$ and piston cylinder to maintain the valve $q$ open with the pressure in the tank $a$ as long as may be desired, independently of the automatic operations.

What I claim is as follows:

1. In apparatus for controlling and utilizing fluid pressure, the combination of an appliance to which the pressure is to be applied, a pressure pipe leading to said appliance, valve devices to control said pressure pipe to admit pressure to said appliance, a pressure motor to control said valve devices, means exterior to said appliance independent of any mechanical moving parts in said appliance but controlled directly by the conditions therein to control said pressure motor, and means to relieve said pressure motor independently of the conditions in the appliance.

2. In apparatus for controlling and utilizing fluid pressure, the combination of an appliance to which the pressure is to be applied, a pressure pipe leading to said appliance, valve devices to control said pressure pipe to admit pressure to said appliance, means automatically controlled by the conditions in the appliance to operate said valve devices to admit pressure to the appliance, and devices controlled by the means to operate the valve devices but independent of the conditions in the appliance to control the action of said means to operate the valve devices after said means have been actuated under the control of the conditions in the appliance to operate said valve devices to admit pressure to the appliance.

3. In apparatus for controlling and utilizing fluid pressure, the combination of an appliance to which the pressure is to be applied, a pressure pipe leading to said appliance, valve devices to control said pressure pipe to admit pressure to the appliance, a pressure motor to control said valve devices, a valve to control the admission of pressure to said pressure motor, means exterior to said appliance independent of any mechanical moving parts in said appliance but automatically controlled by the conditions therein to open said valve and admit pressure to the motor, and means independent of the conditions in the appliance and controlled by said motor to close said valve after said motor has been actuated under the control of the conditions in the appliance to open said valve devices to admit pressure to the appliance.

4. In apparatus for controlling and utilizing fluid pressure, the combination of an appliance to which the pressure is to be applied, a pressure pipe leading to said appliance, valve devices to control said pressure pipe to admit pressure to the appliance and to relieve the same, a pressure motor to control said valve devices, a valve to control the admission of pressure to said pressure motor, means to open said valve and admit pressure to the motor, means controlled by said motor to close said valve after said motor has operated the valve devices controlled by it to admit pressure to the appliance, and independent means for relieving the pressure on said motor to enable it to return.

5. In apparatus for controlling and utilizing fluid pressure, the combination of an appliance to which the pressure is to be applied, a delivery pipe leading to said appliance, a pressure supply pipe, and a vent pipe, valve devices to control communication between said delivery pipe and the pressure supply pipe and vent pipe respectively, means controlled by the conditions in the appliance to operate said valve devices to open communication between said pressure supply pipe and delivery pipe, means to control the return of said valve devices to open communication between the delivery pipe and vent pipe independently of the conditions in the appliance, and means controlled by the conditions in the appliance to control said vent pipe.

6. In apparatus for controlling and utilizing fluid pressure, the combination of an appliance to which the pressure is to be applied, a delivery pipe leading to said appliance, valve devices to open said pipe to a pressure supply or to a vent, means controlled by the conditions in the appliance to operate said valve devices to open said pipe to the pressure supply, means independent of the conditions in the appliance to automatically control said valve devices to close communication between said pipe and the pressure supply after an interval, and means controlled by the conditions in the tank to control the vent for said pipe.

7. In apparatus for controlling and utilizing fluid pressure, the combination of an appliance to which the pressure is to be applied, a delivery pipe leading to said appliance, valve devices to open said pipe to a pressure supply or to a vent, valve actuating devices for controlling said valve devices, a pressure motor controlled by the conditions in the appliance for operating said valve actuating devices to open said pipe to the pressure supply, means independent of said pressure motor for controlling the operation of said valve devices to close communication between said pipe and the pressure supply and open the communication with the vent, and means to control said vent controlled by said pressure motor.

8. In apparatus for controlling and utilizing fluid pressure, the combination of an appliance to which the pressure is to be applied, a delivery pipe leading to said appliance, valve devices to open communication between said pipe and a pressure supply or vent, a piston for operating said valve devices, a valve to control the admission of pressure to said piston, means controlled by said piston to close said valve after the piston has operated to open the pipe to the pressure supply, and means to control the relief of the pressure on said piston after said valve is closed.

9. In apparatus for controlling and utilizing fluid pressure, the combination of an appliance to which the pressure is to be applied, a delivery pipe leading to said appliance, valve devices to open communication between said pipe and a pressure supply or vent, a piston for operating said valve devices, a valve to control the admission of pressure to said piston, means controlled by said piston to close said valve after the piston has operated to open the pipe to the pressure supply, means to control the relief of the pressure on said piston after said valve is closed, and means to control said vent independently of the operation of said valve devices.

10. In apparatus for controlling and utilizing fluid pressure, the combination of an appliance to which the pressure is to be applied, a delivery pipe leading to said appliance, valve devices to open communication between said pipe and a pressure supply or vent, a piston for operating said valve devices, a valve to control the admission of pressure to said piston, means exterior to said appliance independent of any mechanical moving parts in said appliance but controlled by the conditions therein to operate said valve to admit pressure to said piston, means controlled by said piston to close said valve after the piston has operated the valve devices to open the delivery pipe to the pressure supply, and means to control the relief of the pressure on said piston after the valve is closed.

11. In appartaus for controlling and utilizing fluid pressure, the combination of an appliance to which the pressure is to be applied, a pressure pipe leading to said appliance, valve devices to control said pressure pipe to admit pressure to the tank and to relieve the same, a piston for controlling said valve devices, a chamber of variable cubical capacity in communication with said piston, and means for admitting fluid pressure to said chamber, whereby the action of said piston may be regulated by the cubical capacity of said chamber.

12. In apparatus for controlling and utilizing fluid pressure, the combination of an appliance to which the pressure is to be applied, a pressure pipe leading to said appliance, valve devices to control said pressure pipe to admit pressure to the appliance and to relieve the same, a piston for controlling said valve devices, a chamber adapted to contain liquid, the upper portion of which is in communication with said piston, and means for admitting fluid pressure to said chamber; whereby the cubical capacity of said chamber and the operation of said piston may be regulated by varying the volume of liquid in said chamber.

13. In apparatus for controlling and utilizing fluid pressure, the combination of an appliance to which the pressure is to be applied, a pressure pipe leading to said appliance, valve devices to control said pressure pipe to admit pressure to the appliance and to relieve the same, a piston for controlling said valve devices, a valve to control the admission of motor fluid to said piston, a lever for operating said valve having a movable fulcrum at one end, a pressure motor connected with the other end of said lever, whereby said lever is operated and the valve opened by the movement of said pressure motor, and means controlled by the piston to move said fulcrum and release the lever and close the valve independently of the action of said pressure motor.

14. In apparatus for controlling and utilizing fluid pressure, the combination of an appliance to which the pressure is to be applied, a fluid pressure pipe leading to said appliance, valve devices to control said pipe, pneumatic devices for operating said valve devices to admit fluid pressure to said pipe, and means independent of the conditions in the appliance to independently control the return of said pneumatic devices and to operate the valve devices to relieve the pressure in said pipe, and timing devices to regulate the interval of time before the pressure in said pipe will be relieved.

15. In apparatus for controlling and utilizing fluid pressure, the combination of an appliance to which the pressure is to be applied, a fluid pressure pipe leading to said appliance, valve devices to control said pipe, pneumatic devices for operating said valve devices, a valve to control the admission of fluid pressure to said pneumatic devices to operate the same for the purpose of actuating the valve devices to admit pressure to said pipe, means independent of said valve to control and time the return of said pneumatic devices for the purpose of actuating said valve devices to relieve the pressure in said pipe, and means controlled by said pneumatic devices for controlling said valve after said pneumatic devices have operated.

16. In apparatus for controlling and utilizing fluid pressure, the combination of an appliance to which the pressure is to be applied, a delivery pipe leading to said appliance, a pressure supply pipe, and a vent, valve devices to control communication between said delivery pipe and the pressure supply pipe and vent respectively, means controlled by the conditions in the appliance to operate said valve devices to open communication between the pressure supply pipe and delivery pipe, means to control the return of said valve devices to open communication between the delivery pipe and vent, and means controlled by the conditions in the appliance to control said vent independently of said means to control the valve device.

17. In apparatus for controlling and utilizing fluid pressure, the combination of an appliance to which the pressure is to be applied, a delivery pipe leading to said appliance, valve devices to control the admission and relief of fluid pressure to said delivery pipe, a secondary valve, independent of said valve devices, for controlling the relief from said delivery pipe, and means controlled by the pressure in the appliance for controlling said secondary valve and the relief of the tank through said delivery pipe.

In testimony of which invention, I have hereunto set my hand.

EDWARD C. MOORE.

Witnesses:
R. M. KELLY,
M. F. DRISCOLL.